United States Patent
Jhaj et al.

(10) Patent No.: US 10,725,618 B2
(45) Date of Patent: Jul. 28, 2020

(54) POPULATING CONTACT INFORMATION

(71) Applicant: BlackBerry Limited, Waterloo (CA)

(72) Inventors: Jasvir Jhaj, Brampton (CA); Arthur Jonathan Wirski, Brampton (CA); Spencer Lloyd, Waterloo (CA); Timothy William O'Connor, Toronto (CA); Octavian Sandru, Nepean (CA); Xiaming Xi, Kanata (CA); Mohammad Ahsun Qureshi, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 268 days.

(21) Appl. No.: 15/374,660

(22) Filed: Dec. 9, 2016

(65) Prior Publication Data

US 2017/0169118 A1    Jun. 15, 2017

Related U.S. Application Data

(60) Provisional application No. 62/266,463, filed on Dec. 11, 2015.

(51) Int. Cl.
| | | |
|---|---|---|
| *G06F 3/0482* | (2013.01) | |
| *G06F 16/9535* | (2019.01) | |
| *G06F 16/951* | (2019.01) | |
| *G06F 16/84* | (2019.01) | |
| *G06F 16/245* | (2019.01) | |
| *G06F 16/9537* | (2019.01) | |
| *G06Q 30/02* | (2012.01) | |
| *G06Q 10/10* | (2012.01) | |

(52) U.S. Cl.
CPC ........ *G06F 3/0482* (2013.01); *G06F 16/9535* (2019.01); *G06F 16/245* (2019.01); *G06F 16/84* (2019.01); *G06F 16/951* (2019.01); *G06F 16/9537* (2019.01); *G06Q 10/109* (2013.01); *G06Q 30/0256* (2013.01); *G06Q 30/0261* (2013.01)

(58) Field of Classification Search
CPC .......... G06F 17/30867; G06F 17/3087; G06F 17/30864; G06F 17/30914; G06F 17/30241; G06F 17/30424; G06F 17/30525; G06F 17/3053; G06F 17/30554; G06F 17/30601; G06F 17/30893; G06F 16/9535; G06F 16/9537; G06F 16/951; G06F 16/84; G06F 16/245; G06F 16/24578; G06F 16/907; G06F 16/972; H04M 3/4931
USPC ....... 707/769, 706, 723, 722, 732, 765, 766, 707/780, 781
See application file for complete search history.

(56) References Cited

U.S. PATENT DOCUMENTS 7,505,568 B2 *  3/2009  Simpson .............. G06Q 10/087
                                                  379/88.01
7,624,101 B2 * 11/2009  Lin ..................... G06F 16/9537
(Continued)

*Primary Examiner* — Dangelino N Gortayo
(74) *Attorney, Agent, or Firm* — Fish & Richardson P.C.

(57) ABSTRACT

Systems, methods, and software can be used to populate contact information. In some aspect, a search term for a contact is received at an electronic device. A query for contact information is sent from the electronic device to a server. The query includes the search term. A query response is received from the server. Contact information for the contact is identified based on the query response. A contact record for the contact is populated using the identified contact information.

14 Claims, 10 Drawing Sheets

(56) References Cited

U.S. PATENT DOCUMENTS

| | | | | |
|---|---|---|---|---|
| 8,437,779 | B2* | 5/2013 | Phukan | H04M 1/274516 |
| | | | | 455/456.3 |
| 8,972,398 | B1* | 3/2015 | Bursey | G06F 16/9535 |
| | | | | 707/732 |
| 8,984,049 | B1* | 3/2015 | Rekhi | G06F 16/84 |
| | | | | 709/203 |
| 10,565,219 | B2* | 2/2020 | Gross | H04L 51/28 |
| 2008/0071544 | A1* | 3/2008 | Beaufays | H04M 3/4935 |
| | | | | 704/270.1 |
| 2008/0313154 | A1* | 12/2008 | Wallis | G06Q 10/109 |
| 2011/0145101 | A1* | 6/2011 | Berger | G06Q 10/107 |
| | | | | 705/27.1 |
| 2013/0007049 | A1* | 1/2013 | Ziemann | G06T 11/20 |
| | | | | 707/769 |
| 2014/0146960 | A1* | 5/2014 | Williams | H04M 3/5238 |
| | | | | 379/265.09 |
| 2014/0164341 | A1* | 6/2014 | Baratta | G06F 17/30867 |
| | | | | 707/706 |
| 2015/0237087 | A1* | 8/2015 | Rekhi | H04L 65/403 |
| | | | | 709/204 |
| 2015/0347985 | A1* | 12/2015 | Gross | G06F 16/2379 |
| | | | | 705/7.19 |
| 2015/0370905 | A1* | 12/2015 | Leon | G06Q 10/10 |
| | | | | 707/722 |
| 2016/0140167 | A1* | 5/2016 | Perez | G06F 17/30424 |
| | | | | 707/769 |
| 2016/0371273 | A1* | 12/2016 | Lan | G06Q 30/00 |

\* cited by examiner

POPULATING CONTACT INFORMATION

CROSS REFERENCE TO RELATED APPLICATIONS

This application claims the benefit of priority of U.S. Application Ser. No. 62/266,463, filed on Dec. 11, 2015, which is incorporated by reference herein in its entirety.

TECHNICAL FIELD

The present disclosure relates to populating contact information.

BACKGROUND

Many communication devices, e.g., mobile devices, or other computer systems, enable a user to manage contacts by storing contact information in contact records. Examples of contacts can include people or business entities that the user may interact with, e.g., friends, relatives, customers, supplies, etc. Examples of contact information in a contact record can include a name, an address, a phone number, a fax number, an email address, a link to a website, and a social media account.

DESCRIPTION OF DRAWINGS

Like reference numbers and designations in the various drawings indicate like elements.

DETAILED DESCRIPTION

In some cases, a user can populate a contact record by manually entering contact information of a contact on the electronic device. Such processes may be tedious and time consuming. In some cases, a contact application can automatically populate some contact information of a contact record based on contact information of other contact records that are stored on the electronic device. However, the information of contact records stored on the electronic device may be limited and therefore, the improvement can be limited.

In some cases, contact information can be populated into a contact record automatically based on a search conducted outside of the electronic device. For example, the search can be performed on servers that have access to contact information of many business entities. Alternatively or in combination, the search can be performed on the Internet using search engines. The contact information obtained from the search can be populated automatically in the contact record. This approach can improve the speed and user experience of populating contact information. FIGS. 1-10 and associated descriptions provide additional details of these implementations.

Figure 1:
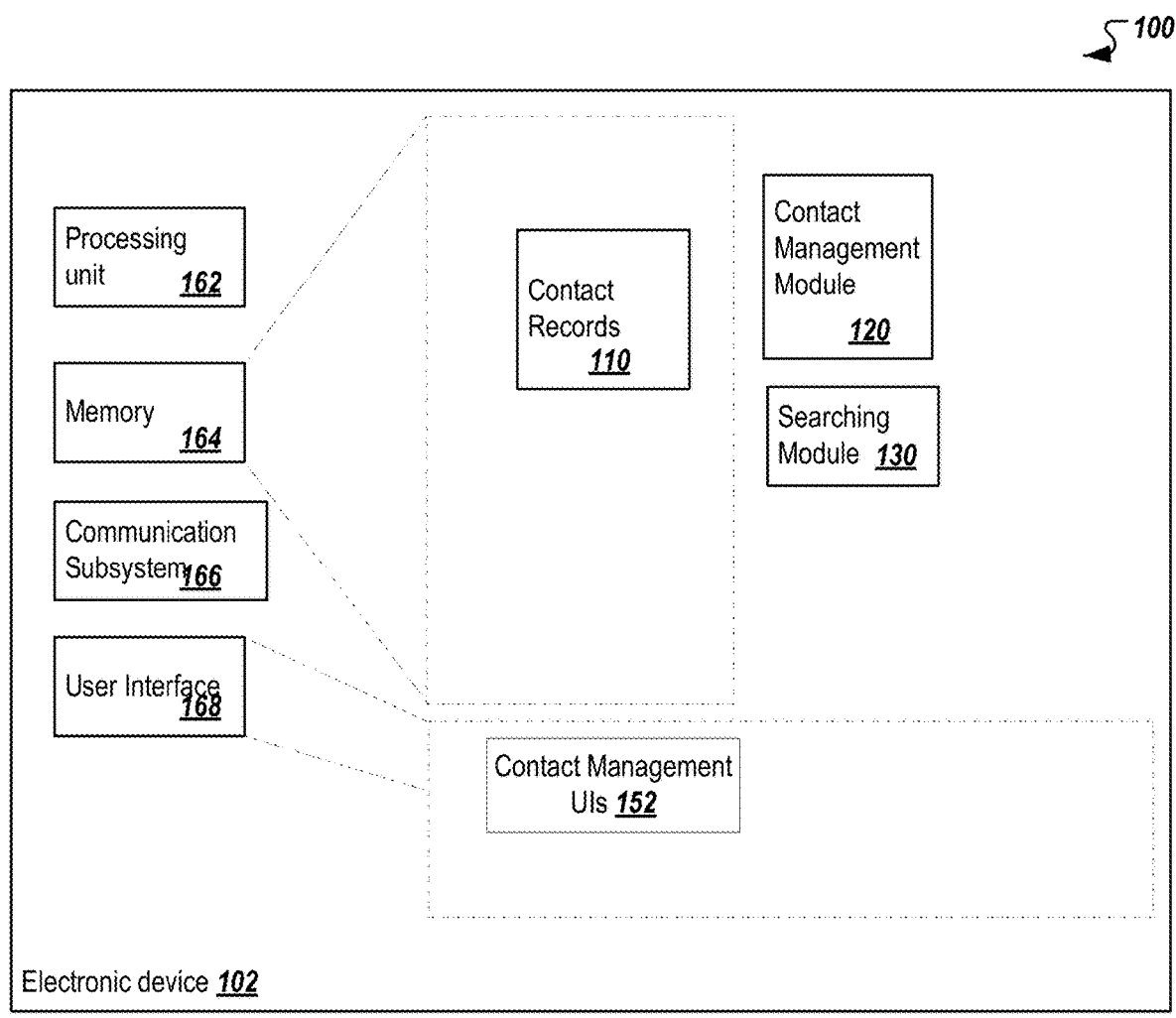
FIG. 1 is a schematic diagram showing an example of populating contact information in an example electronic device.

FIG. 1 is a schematic diagram 100 showing an example of populating contact information in an example electronic device 102. The electronic device 102 includes a processing unit 162, a communication subsystem 166, a user interface 168, and a memory 164. The electronic device 102 also includes a contact management module 120 and a searching module 130. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 162 can be configured to generate control information, such as a measurement report, or respond to received information, such as control information from a network node. In some cases, the processing unit 162 can also be configured to make a radio resource management (RRM) decision, such as cell selection/reselection information or trigger a measurement report. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

The example user interface 168 can include, for example, one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 1, the example user interface 168 can be configured to present contact management user interfaces 152. The contact management user interfaces 152 can include user interfaces that are configured to enable the user to search, add, remove, or overwrite contact information. FIGS. 2-10 and associated descriptions provide additional details of these implementations.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of electronic device 102 and various other computer-executable software programs for performing one or more of the processes, steps, or actions described above.

As shown in FIG. 1, the electronic device 102 includes contact records 110. The contact records 110 represent an application, set of applications, software, software modules, hardware, or combination thereof that can be configured to store contact information. Examples of contact records include address books, contact lists, etc. In some cases, a contact record can include one or more attributes. Each attribute can represent a type of contact information. Example of attributes can include a name, an address, a phone number, a fax number, an email address, a link to a website, and a social media account. Therefore, different contact information of a business or a person can be stored according to the respective attribute in the contact record.

The electronic device 102 also includes a contact management module 120. The contact management module 120 represents an application, set of applications, software, software modules, hardware, or combination thereof that can be configured to add, modify, or remove contact information. In some cases, the contact management module 120 can generate a user interface for a user to enter a search term. The contact management module 120 can send the search term to the searching module 130. The contact management module 120 can receive the query response from the searching module 130. The contact management module 120 can parse the query response, identify the contact information, and populate attributes of a contact record using the identified contact information. FIGS. 2-10 and associated descriptions provide additional details of these implementations.

The electronic device 102 also includes a searching module 130. The searching module 130 represents an application, set of applications, software, software modules, hardware, or combination thereof that can be configured to generate a query of contact information and communicate with a server to perform the search. In some cases, the searching module 130 can generate a query based on the search term. The searching module 130 can send the query to a server and receive the query response from the server. FIGS. 2-10 and associated descriptions provide additional details of these implementations.

Turning to a general description, a mobile device, e.g., the electronic device 102, may be referred to as mobile electronic device, user device, mobile station, subscriber station, portable electronic device, mobile communications device, wireless modem, or wireless terminal. Examples of an electronic device (e.g., the electronic device 102) may include a cellular phone, personal data assistant (PDA), smart phone, laptop, personal computer (PC), tablet, pager, portable computer, portable gaming device, wearable electronic device, desktop computer, or other communication devices having components for communicating via a wireless or a wireline communication network.

Figure 2:
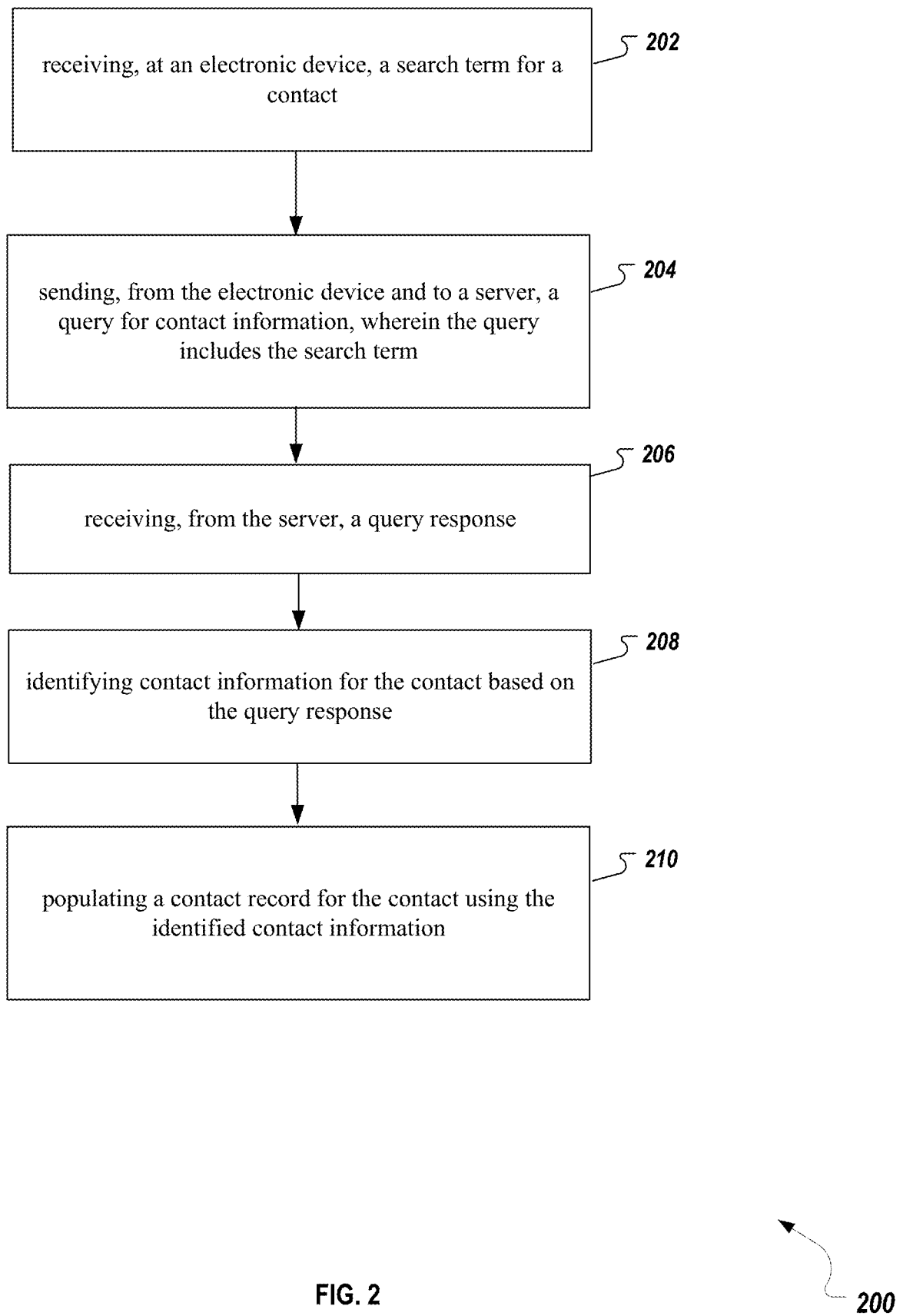
FIG. 2 is a flowchart showing an example process for populating contact information.

FIG. 2 is a flowchart showing an example process 200 for populating contact information. The process 200 can be implemented by an electronic device. For example, the process 200 can be implemented by the electronic device 102 shown in FIG. 1 or by another type of electronic device. The example process 200 shown in FIG. 2 can also be implemented using additional, fewer, or different operations, which can be performed in the order shown or in a different order.

Figure 3:
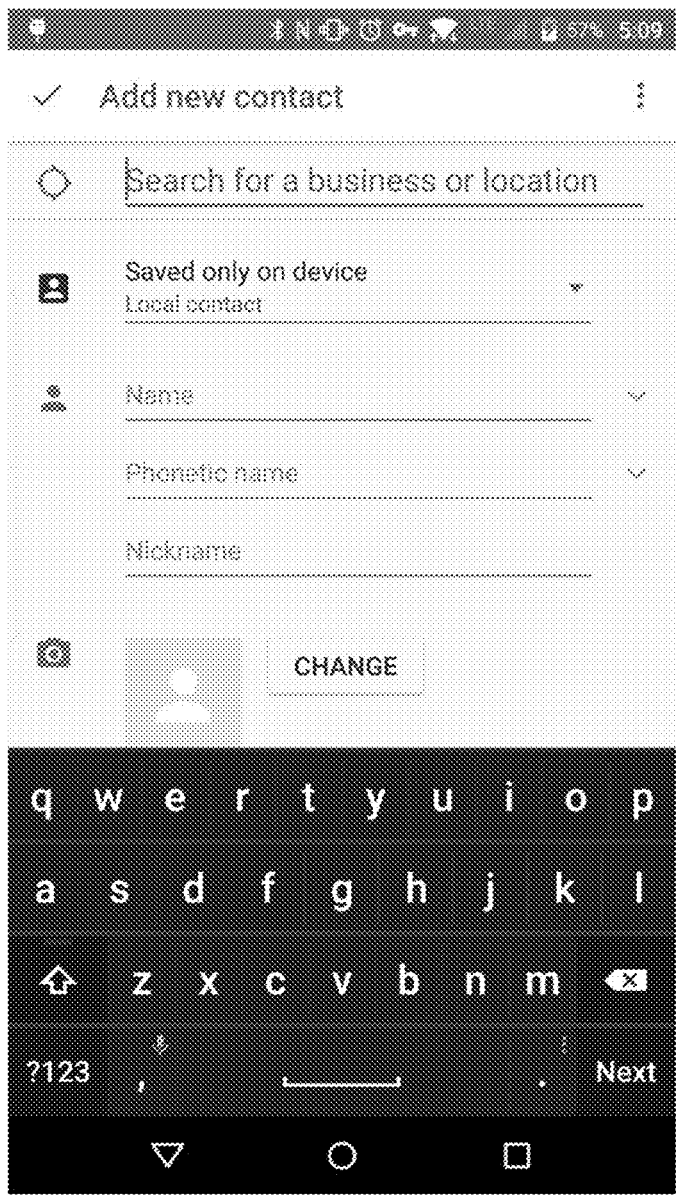
FIG. 3 shows an example graphic user interface for entering a search term.

The example process 200 begins at 202, where a search term for a contact is received at the electronic device. The search term can be used to retrieve contact information for the contact. In some cases, the search term can be entered by a user through a user interface on the electronic device. For example, if a user wants to generate a new contact record or edit an existing contact record, a user can launch a contact application on the electronic device. The contact application can present a user interface that enables the user to enter the search term for the contact. FIG. 3 shows an example graphic user interface 300 for entering a search term. As shown in FIG. 3, a user can enter a search term on the first row of a contact editor. The search term can be any information that is associated with the contact to be searched. For example, the search term can be a name, a location, or a phone number, or any other input strings that can be used to search for the contact.

At 204, a query for contact information is sent from the electronic device. In some cases, the query can include the search term that is received at 202. In some cases, the query can be sent to a service/server that performs the search. For example, a service/server can include an entity information provider. In some cases, the server can have access to contact information of a plurality of business entities. In some cases, the contact information for these business entities can be stored in a database on the server or accessible to the server. Examples of this type of server can include GOOGLE PLACES. In some cases, an application programming interface (API) that can provide interface to this type of server can be invoked to generate the query. For example, the contact application can call the GOOGLE PLACES API to generate a query with the received search term to the GOOGLE PLACES server. Other example APIs/providers may include FourSquare, and general geocoded listings. Alternatively or in combination, the system can access stored geocoded business information on the device, such as stored map data, by API or other mechanisms.

Alternatively or in combination, the server can include a search engine that performs search over the Internet. Examples of this type of server can include GOOGLE, BING, YAHOO, and others. In these or other cases, the query can be formatted according to the protocol for the server that the query is addressed to.

In some cases, the search can be based on the location of the electronic device. For example, the query can include the current location of the electronic device. When the server performs the search, the server can limit the search results to include businesses that are within a radius of the current location. In some cases, the size of the radius can be set by a user or by the server. In some cases, the search information and modification to contact information can also be reported to a contact manager (e.g., via API) outside the device, such as a server/cloud contact manager for synchronizing contacts with multiple devices for the same user, groups, or an organization.

At 206, a query response is received from the server. In some cases, the server can perform a search based on the search term. In some cases, the search can return contact information of business entities associated with the search term. In these or other cases, the server can include the contact information in the query response.

Alternatively or in combination, the search can return a list of initial search results. In some cases, the list of initial search results can include contact information for more than one business entities. Alternatively or in combination, the list of initial search results can include contact information for more than one instantiations of the business entity, e.g., a list of different locations of a business entity. In some cases, the initial search results represent contact information for candidate contacts that the user can select from. In these or other cases, the server can include information of these candidate contacts in the query response.

At 208, contact information is identified based on the query response. In some cases, as described earlier, the query response can include the contact information obtained in the search based on the search term. In these or other cases, the query response can be parsed, and the contact information can be identified. In some cases, different contact information, e.g., a name, an address, a phone number, a fax number, an email address, a link to a website, or a social media account can be parsed and identified separately.

Figure 4:
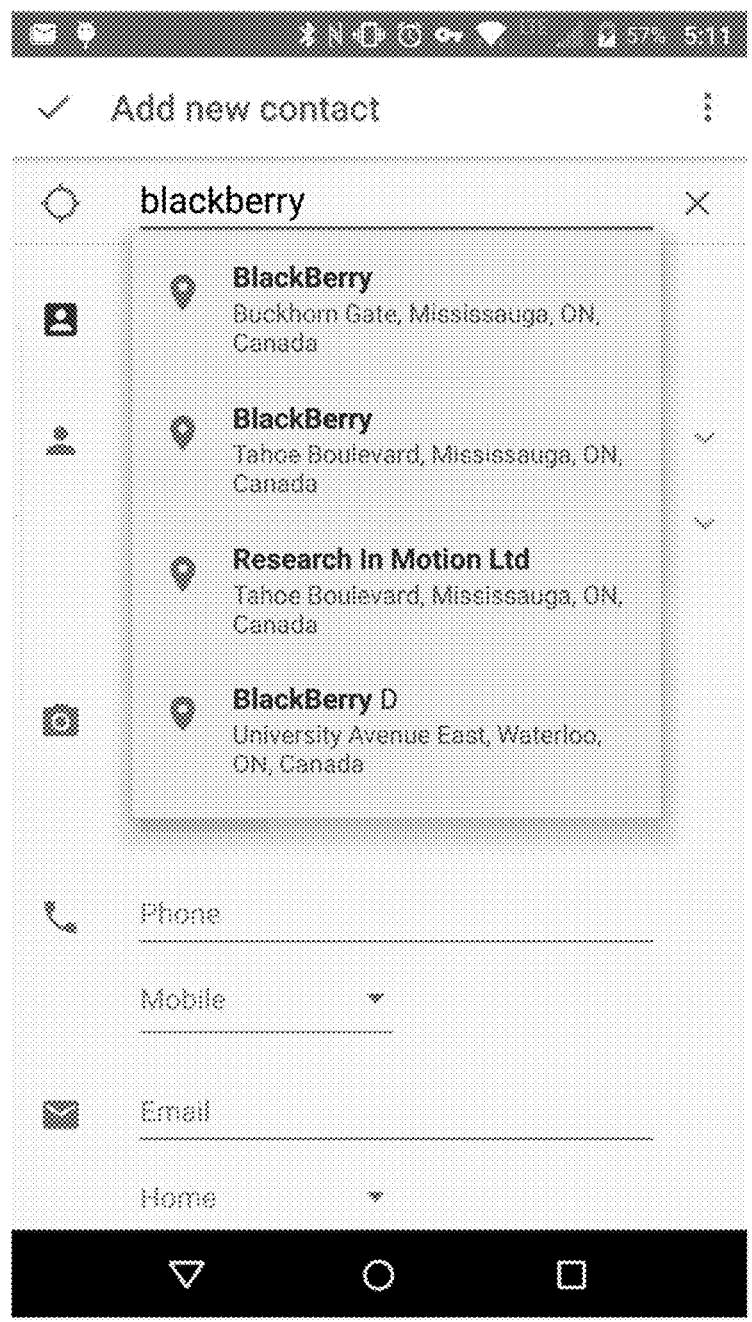
FIG. 4 shows an example graphic user interface for displaying initial search results.

In some cases, as described earlier, the query response can include the initial search results. The initial search results can include contact information of one or more candidate contacts. In these or other cases, the information of these candidate contacts can be displayed through a user interface on the electronic device. FIG. 4 shows an example graphic user interface 400 for displaying the initial search results. As shown in FIG. 4, a user entered "Blackberry" as the search term. The query response includes information of four candidate contacts. In some cases, as shown in FIG. 4, each candidate contact is displayed, along with location information of the respective candidate contact. In some cases, the candidate contacts can be displayed in a drop down menu.

In some cases, a user can select one of the candidate contacts among the candidate contacts. The electronic device can receive the selection and determine a selected candidate contact based on the received selection. In some cases, a second query can be generated and sent to the server. The second query can include the information of the selected candidate contact. For example, the second query can include the location information of the selected candidate contact. The server can perform a second search based on the second query. The second search can provide contact information of the selected candidate contact. The server can include the contact information of the selected candidate contact in a second query response and send to the electronic device. The second query response can be parsed, and the contact information can be identified.

At 210, a contact record for the contact is populated using the identified contact information. In some cases, one or more attributes of the contact record can be populated using the identified contact information. In some cases, the contact record is a new contact record generated based on the query response. Alternatively or in combination, the contact record is previously created and is populated with the additional contact information obtained from the query response.

Figure 5:
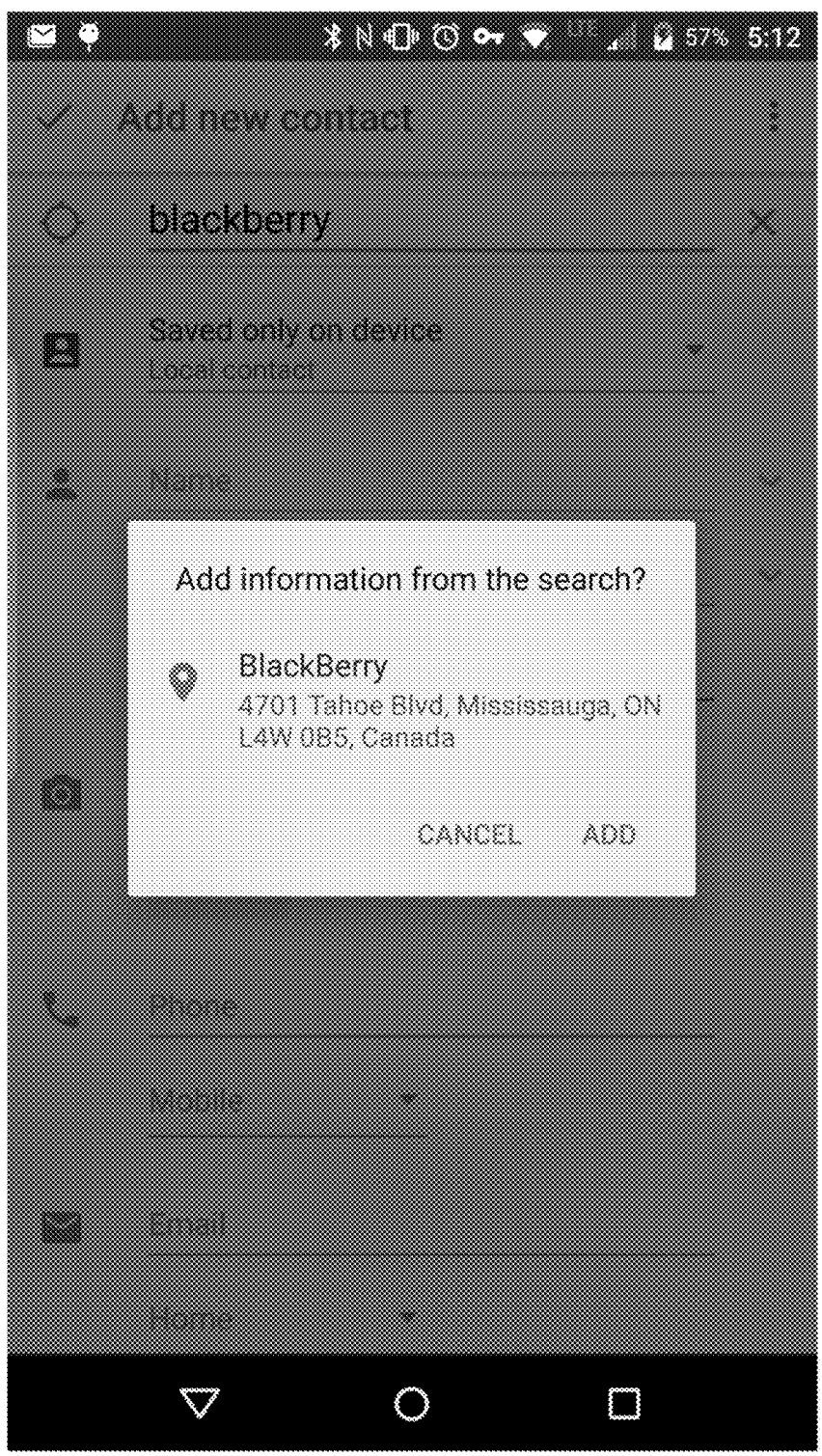
FIG. 5 shows an example graphic user interface for a user confirmation.

In some cases, the population of the contact information can be performed based on user confirmation. FIG. 5 shows an example graphic user interface 500 for a user confirmation. In the example shown in FIG. 5, the user has selected "Blackberry" at the Mississauga location among the list of candidate contacts shown in FIG. 4. As shown in FIG. 5, a confirmation dialogue box is displayed. If the user selects the "add" button, the contact information associated with BLACKBERRY at the Mississauga location will be automatically populated in the contact record. If the user selects the "cancel" button, the contact information will not be populated. In some cases, after the selection of the "cancel" button, the contact edit page with the search term will appear again, and the user can add or edit the search term to perform another search.

Figure 6:
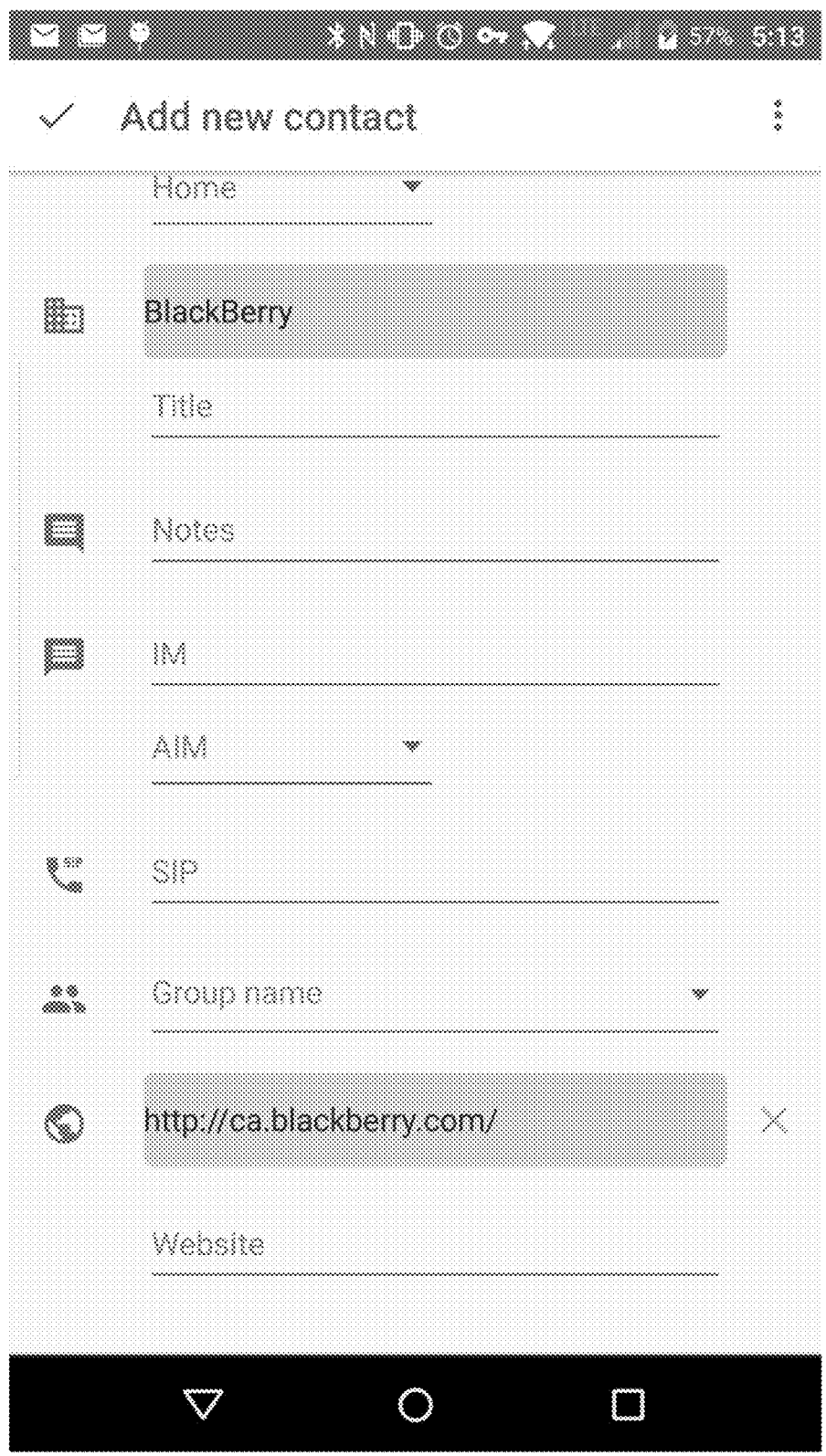
FIG. 6 shows an example graphic user interface for populating the contact record.

FIG. 6 shows an example graphic user interface 600 for populating the contact record. As shown in FIG. 6, the name and website of the select business are added to the respective attribute of the contact record. In some cases, this information is included in the query response or the second query response discussed previously. In some cases, the newly added information can be highlighted.

Figure 7:
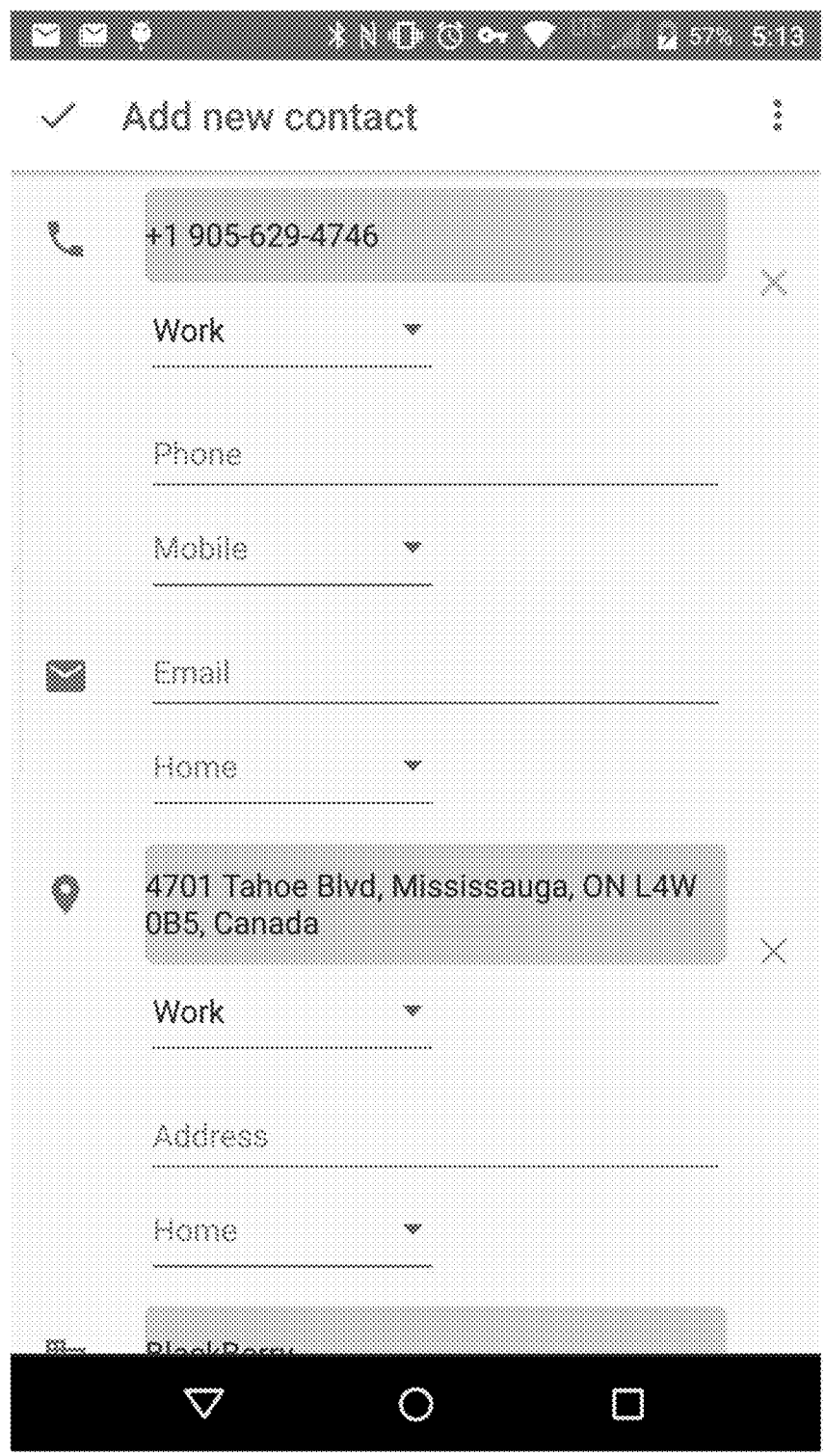
FIG. 7 shows another example graphic user interface for populating the contact record.

FIG. 7 shows another example graphic user interface 700 for populating the contact record. As shown in FIG. 7, the phone number and address of the select business are added to the respective attribute of the contact record. In some cases, this information is included in the query response or the second query response discussed previously.

Figure 8:
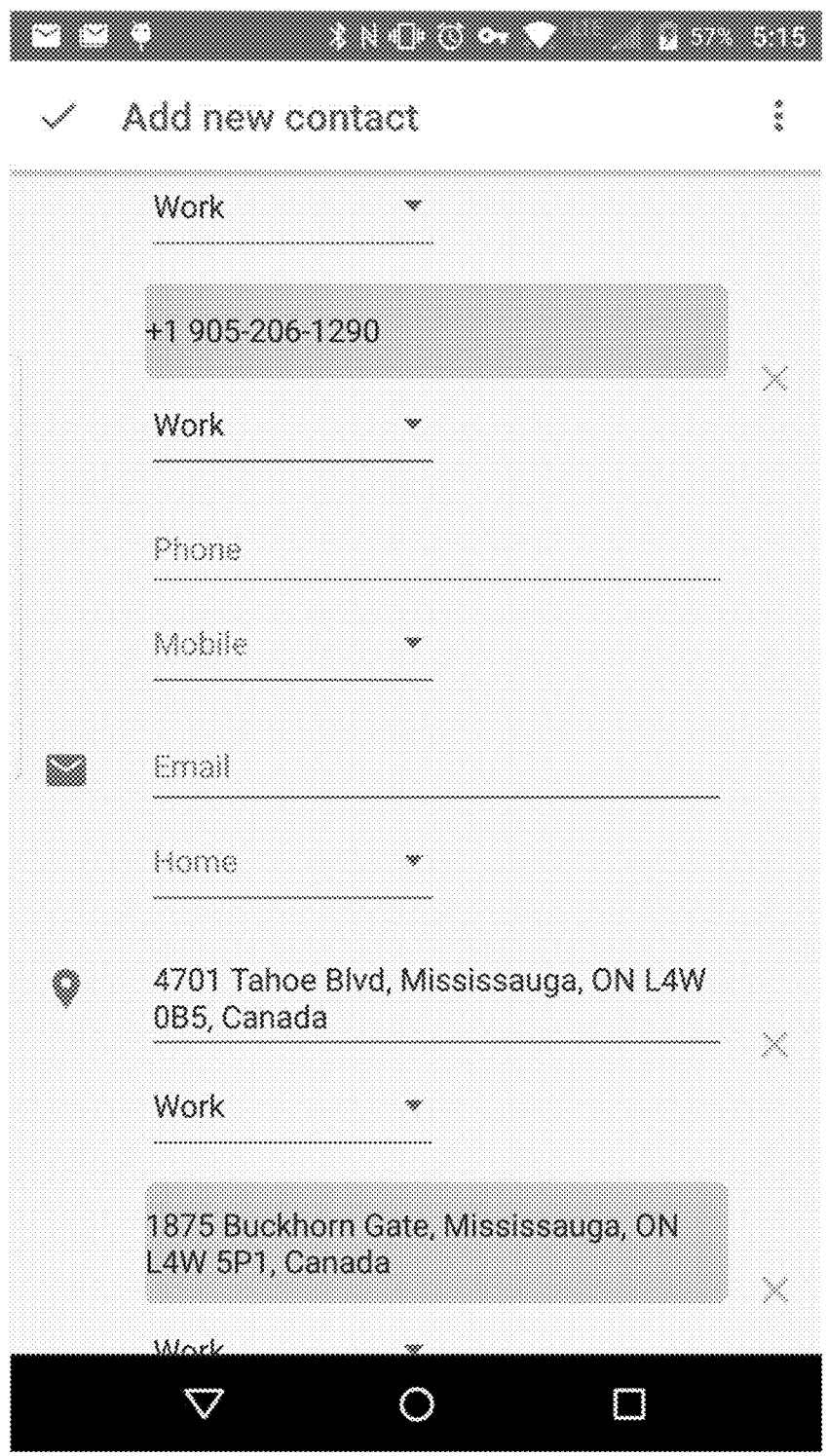
FIG. 8 shows an example graphic user interface for adding the contact information.

In some cases, a contact record stored on the electronic device before the query may include existing contact information associated with the queried business. For example, some contact information can be populated as a result of a previous query and generation of a contact record. In these cases, the contact information identified at 208 can be added to the existing contact information with the same attributes. FIG. 8 shows an example graphic user interface 800 for adding the contact information. As shown in FIG. 8, the existing contact information includes a phone number for work and an address at 4701 Tahoe Blvd. The new contact information identified based on the search includes a new work phone number "+1 905-206-1290" and a new address at Buckhorn Gate. The new contact information is added to existing information having the same attributes.

In some cases, new contact information can be added to the existing information of the same attribute based on user confirmation. For example, a user interface, e.g., a dialog box, can be displayed on the electronic device to inform the user that there is existing information associated with the queried business. If a user selects to add, the new information can be added.

Figure 9:
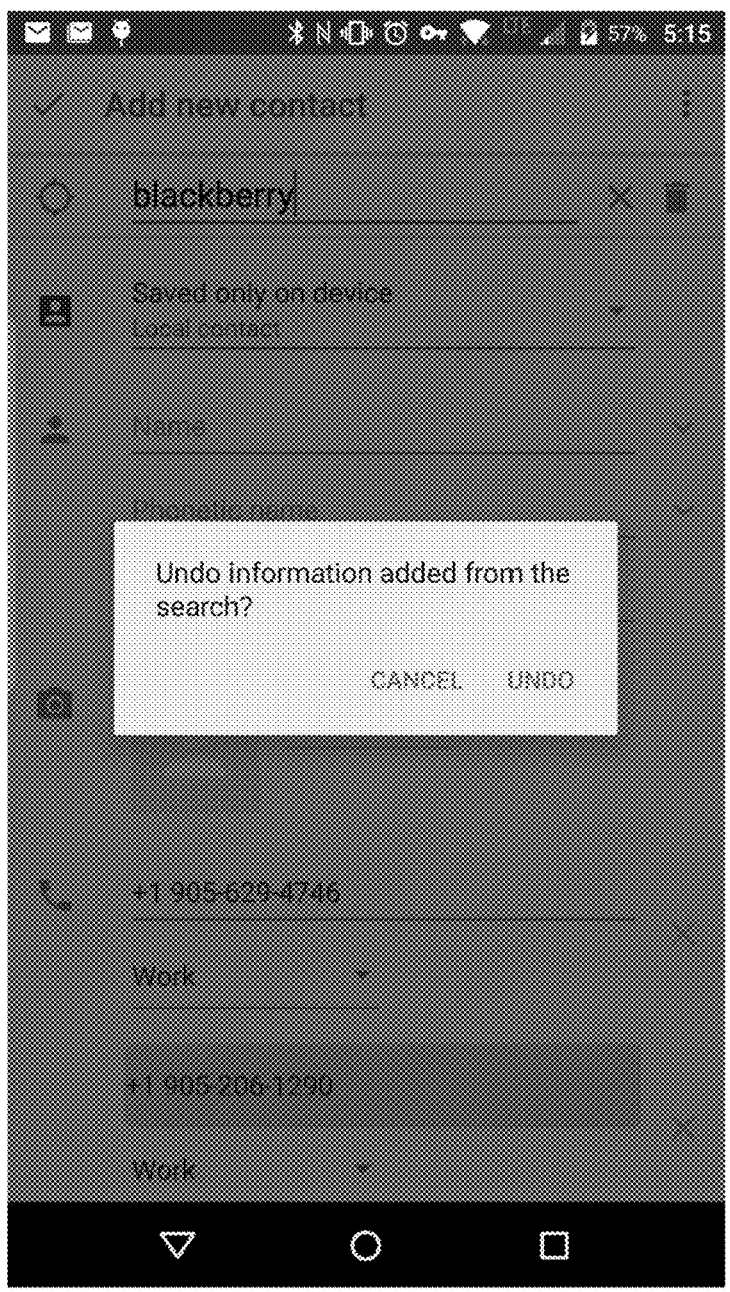
FIG. 9 shows an example graphic user interface for removing the added contact information.

Alternatively or in combination, the new information can be added automatically. The user can determine whether to remove the added information. FIG. 9 shows an example graphic user interface 900 for removing the added contact information. As shown in FIG. 9, a dialog box is displayed on the electronic device. If the user selects the "undo" button, the newly added contact information will be removed. If the user selects the "cancel" button, the newly added contact information will remain in the contact record.

Figure 10:
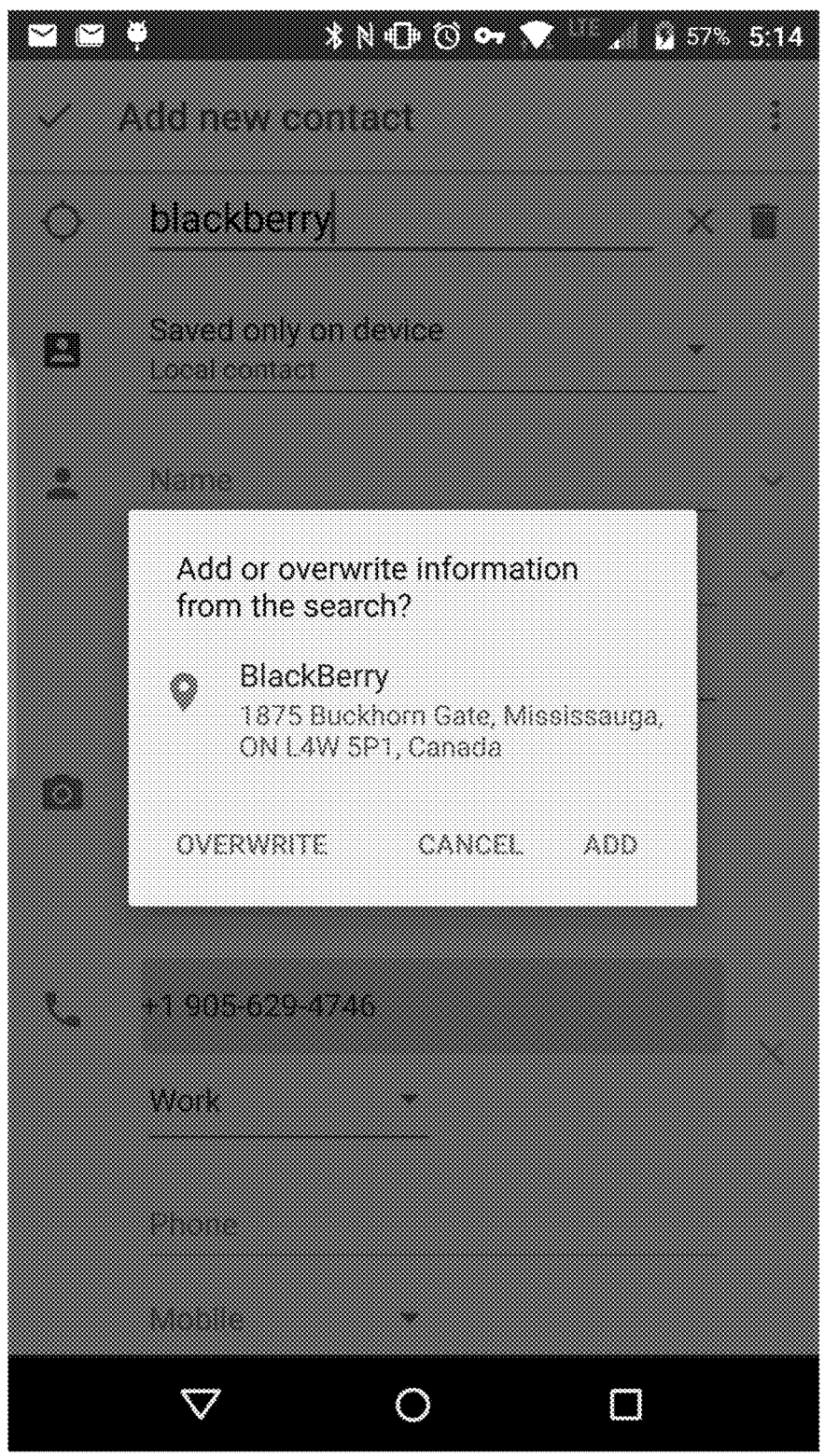
FIG. 10 shows an example graphic user interface for replacing or adding contact information.

In some cases, a user can select whether to replace existing information with the contact information identified at 208. FIG. 10 shows an example graphic user interface 1000 for replacing contact information. As shown in FIG. 10, a dialog box is displayed on the electronic device. If the user selects the "add" button, the identified contact information will be added. If the user selects the "overwrite" button, the identified contact information will overwrite the existing contact information. If the user selects "cancel" button, the identified contact information will not be added to the contact record. The existing contact information will remain in the contact. In some cases, the user may be taken back to the user interface for entering the search term, e.g., the contact editor discussed at 202. In some cases, the previously entered search term can remain in the search text input box.

In some cases, an entity information provider (e.g., GOOGLE PLACES) may accept information about what is done with the information, such as accepted as a new contact, updated contact, or ignored, so that the entity information provider may fine tune their information or use for popularity ranking, or advertising.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method, comprising:
    outputting, by a contact editor application executing on an electronic device, a contact editing user interface on the electronic device;
    receiving, by the contact editor application executing on the electronic device, a user input from the contact editing user interface, wherein the user input comprises a search term for a contact;
    generating, by the contact editor application executing on the electronic device, a query for contact information, wherein the query includes the search term, and wherein the generating the query comprises:
        identifying, by the contact editor application executing on the electronic device, an application programming interface (API) that corresponds to a server that stores the contact information; and
        invoking, by the contact editor application executing on the electronic device, the API that corresponds to the server to generate the query;
    sending, from the electronic device to the server, the query for contact information;
    receiving, at the electronic device from the server, a query response;
    identifying, by the contact editor application executing on the electronic device, information for the contact based on the query response, wherein the query response includes a plurality of candidate contacts, and the identifying contact information comprises:
        receiving, at the electronic device, a selection of a candidate contact among the plurality of candidate contacts;
        sending, to the server, a selected candidate contact among the plurality of candidate contacts; and
        receiving, from the server, the contact information for the selected candidate contact; and
    populating, by the contact editor application executing on the electronic device, a contact record for the contact using the identified contact information.

2. The method of claim 1, wherein the query response includes location information of the plurality of candidate contacts.

3. The method of claim 1, wherein the query includes location information of the electronic device.

4. The method of claim 1, wherein the contact record is populated based on a user selection.

5. The method of claim 1, wherein the contact record is populated based on a previous query response.

6. An electronic device, comprising:
    a memory; and
    at least one hardware processor communicatively coupled with the memory and configured to:
        output, by a contact editor application executing on the electronic device, a contact editing user interface on the electronic device;
        receive, by the contact editor application executing on the electronic device, a user input from the contact editing user interface, wherein the user input comprises a search term for a contact;
        generate, by the contact editor application executing on the electronic device, a query for contact information, wherein the query includes the search term, and wherein the generation of the query comprises:
            identification by the contact editor application executing on the electronic device, an application programming interface (API) that corresponds to a server that stores the contact information; and
            invocation by the contact editor application executing on the electronic device, of the API that corresponds to the server to generate the query;
        send, to the server, the query for contact information;
        receive, from the server, a query response;
        identify, by the contact editor application executing on the electronic device, contact information for the contact based on the query response, wherein the query response includes a plurality of candidate contacts, and the identification of the contact information comprises:
            reception at the electronic device, of a selection of a candidate contact among the plurality of candidate contacts;
            transmission to the server, of a selected candidate contact among the plurality of candidate contacts; and
            reception from the server, of the contact information for the selected candidate contact; and
        populate, by the contact editor application executing on the electronic device, a contact record for the contact using the identified contact information.

7. The electronic device of claim 6, wherein the query response includes location information of the plurality of candidate contacts.

8. The electronic device of claim 6, wherein the query includes location information of the electronic device.

9. The electronic device of claim 6, wherein the contact record is populated based on a user selection.

10. The electronic device of claim 6, wherein the contact record is populated based on a previous query response.

11. A non-transitory computer-readable medium containing instructions which, when executed, cause an electronic device to perform operations comprising:
    outputting, by a contact editor application executing on the electronic device, a contact editing user interface on the electronic device;
    receiving, by the contact editor application executing on the electronic device, a user input from the contact editing user interface, wherein the user input comprises a search term for a contact;
    generating, by the contact editor application executing on the electronic device, a query for contact information, wherein the query includes the search term, and wherein the generating the query comprises:
        identifying, by the contact editor application executing on the electronic device, an application programming interface (API) that corresponds to a server that stores the contact information; and
        invoking, by the contact editor application executing on the electronic device, the API that corresponds to the server to generate the query;
    sending, from the electronic device to the server, the query for contact information;

receiving, at the electronic device from the server, a query response;

identifying, by the contact editor application executing on the electronic device, information for the contact based on the query response, wherein the query response includes a plurality of candidate contacts, and the identifying contact information comprises:

receiving, at the electronic device, a selection of a candidate contact among the plurality of candidate contacts;

sending, to the server, a selected candidate contact among the plurality of candidate contacts; and receiving, from the server, the contact information for the selected candidate contact; and populating, by the contact editor application executing on the electronic device, a contact record for the contact using the identified contact information.

12. The non-transitory computer-readable medium of claim 11, wherein the query response includes location information of the plurality of candidate contacts.

13. The non-transitory computer-readable medium of claim 11, wherein the query includes location information of the electronic device.

14. The non-transitory computer-readable medium of claim 11, wherein the contact record is populated based on a user selection.

* * * * *